US011621759B2

United States Patent
Zhou et al.

(10) Patent No.: US 11,621,759 B2
(45) Date of Patent: Apr. 4, 2023

(54) WIRELESS COMMUNICATION SYSTEM, WIRELESS COMMUNICATION DEVICE, AND BEAM PATTERN DETERMINATION METHOD

(71) Applicant: FUJITSU LIMITED, Kawasaki (JP)

(72) Inventors: Liang Zhou, Kawasaki (JP); Takashi Dateki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/708,069

(22) Filed: Mar. 30, 2022

(65) Prior Publication Data

US 2023/0006723 A1 Jan. 5, 2023

(30) Foreign Application Priority Data

Jul. 1, 2021 (JP) .............................. JP2021-110108

(51) Int. Cl.
*H04B 7/06* (2006.01)
*H04B 17/318* (2015.01)
*H04W 16/28* (2009.01)

(52) U.S. Cl.
CPC ......... *H04B 7/0617* (2013.01); *H04B 17/318* (2015.01); *H04W 16/28* (2013.01)

(58) Field of Classification Search
CPC .... H04B 7/0617; H04B 17/318; H04W 16/28
(Continued)

(56) References Cited

U.S. PATENT DOCUMENTS 9,628,164 B1 4/2017 Thompson et al.
2012/0220238 A1* 8/2012 Hosoya ................... H04B 7/06
455/63.4
(Continued)

FOREIGN PATENT DOCUMENTS

JP 2017-143356 A 8/2017
JP 2019-501577 A 1/2019
(Continued)

OTHER PUBLICATIONS

Zhou et al., "True-Time-Delay-Based Fast Beam Training for Millimeter-Wave Communication Systems", 2021 IEEE 94th Vehicular Technology Conference (VTC2021-Fall); Sep. 27-30, 2021, IEEE, Norman, OK, USA.

*Primary Examiner* — Fitwi Y Hailegiorgis
(74) *Attorney, Agent, or Firm* — Myers Wolin, LLC

(57) ABSTRACT

A wireless communication system includes a wireless transmission device and a wireless reception device. The wireless reception device includes: a plurality of reception antennas; and a processor connected to the reception antennas. The processor executes a process including: selecting transmission beam candidates or reception beam candidates based on a reception power of a signal transmitted by using transmission beams of a first array or of a signal received by using reception beams of the first array, the first array setting a delay difference between a plurality of antennas; and determining a beam pattern of a transmission beam and a reception beam based on a reception power of a signal transmitted by using transmission beam candidates formed by a second array or of a signal received by using reception beam candidates formed by the second array, the second array setting a phase difference between a plurality of antennas.

9 Claims, 7 Drawing Sheets

(58) Field of Classification Search
USPC .......................................................... 375/267
See application file for complete search history.

(56) References Cited

U.S. PATENT DOCUMENTS

2019/0115658 A1    4/2019  Iannotti et al.
2021/0050898 A1*   2/2021  Yu ......................... H04L 1/0008

FOREIGN PATENT DOCUMENTS

JP      2020-537432 A    12/2020
WO     2017/095500 A1     6/2017
WO     2019/074580 A1     4/2019

* cited by examiner

FIG.7
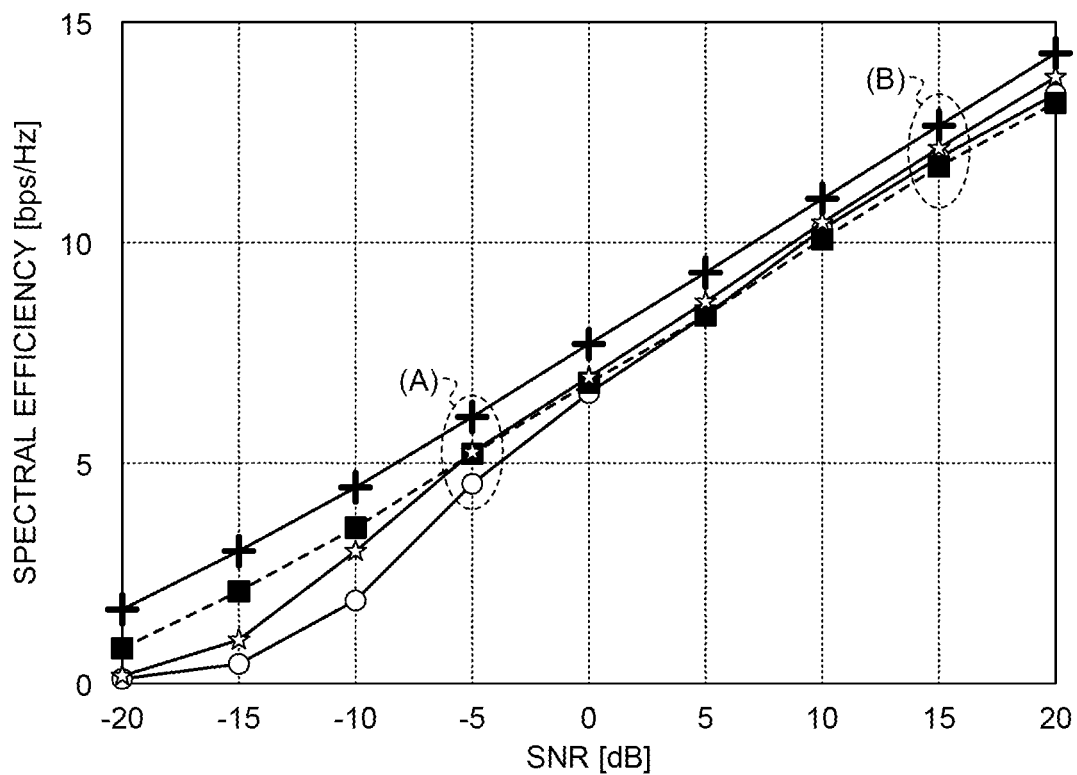
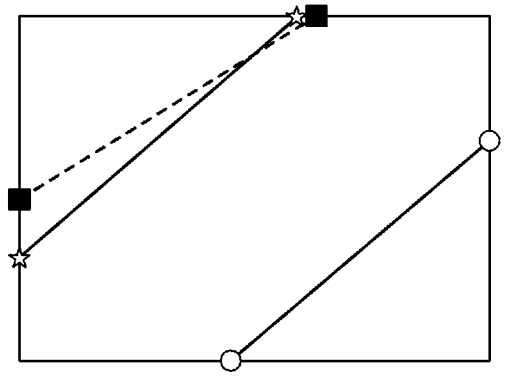
ENLARGED VIEW NEAR (A)
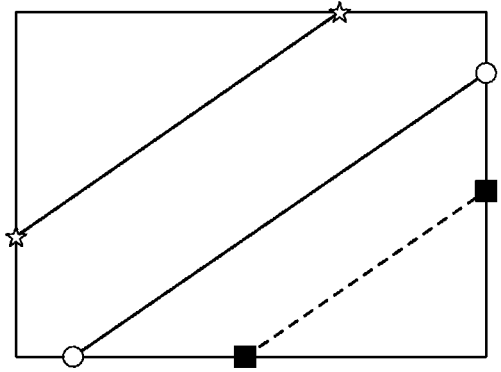
ENLARGED VIEW NEAR (B)

WIRELESS COMMUNICATION SYSTEM, WIRELESS COMMUNICATION DEVICE, AND BEAM PATTERN DETERMINATION METHOD

CROSS-REFERENCE TO RELATED APPLICATION

This application is based upon and claims the benefit of priority of the prior Japanese Patent Application No. 2021-110108, filed on Jul. 1, 2021, the entire contents of which are incorporated herein by reference.

FIELD

The embodiments discussed herein are related to a wireless communication system, a wireless communication device, and a beam pattern determination method.

BACKGROUND

As for the 5th Generation Mobile Communication System (5G) that has recently been put into practical use, it is considered to use radio resources in high frequency bands such as millimeter wave (terahertz: THz) bands, for example. When using such radio resources in the high frequency bands, it is common for the wireless communication devices on the transmission side and the reception side to execute beamforming.

When executing beamforming, a beam pattern, which is a combination of a transmission beam formed by the transmission device and a reception beam formed by the reception device, is determined. That is, the optimal combination of the direction of the transmission beam and the direction of the reception beam may be determined prior to communication. As a beam pattern determination method, there is a method that sequentially forms transmission beams and reception beams to the respective directions by using a phased array, for example, and actually transmits/receives signals for searching the direction of the transmission beam and the reception beam with which the reception power becomes the maximum.

Recently, it is also considered to use a True Time Delay (TTD) array capable of forming beams of different directions for each frequency and transmit/receive Orthogonal Frequency Division Multiplexing (OFDM) symbols including a plurality of subcarriers, for example, to perform fast beam searching.

Patent document 1: Japanese Laid-open Patent Publication No. 2017-143356
Patent document 2: Japanese National Publication of International Patent Application No. 2020-537432
Patent document 3: Japanese National Publication of International Patent Application No. 2019-501577

With the above-described beam searching, however, it is difficult to efficiently determine the optimal beam pattern. That is, when performing beam searching by using the phased array, a single optimal transmission beam is determined after sequentially forming all transmission beams, and a single optimal reception beam is determined after sequentially forming all reception beams. Therefore, it takes a great number of signal transmission times until determining the beam pattern, which results in causing overhead increase. That is, it is difficult to efficiently determine the beam pattern.

In the meantime, beam searching using the TTD array needs only a smaller number of signal transmission times, which results in causing no overhead increase. However, the optimal beam direction is not always selected depending on the radio environment, since the beam direction is determined depending on the frequency. That is, the wireless quality such as Signal to Noise Ratio (SNR), for example, varies depending on the frequency, so that the beam in the direction corresponding to the frequency of low SNR may be determined to be of a lower property than it actually is. Therefore, there is a certain limit in the performance of beam searching using the TTD array.

SUMMARY

According to an aspect of an embodiment, a wireless communication system includes a wireless transmission device and a wireless reception device. The wireless reception device includes: a plurality of reception antennas; and a processor connected to the reception antennas. The processor executes a process including: selecting transmission beam candidates or reception beam candidates based on a reception power of a signal transmitted by using transmission beams of a first array or of a signal received by using reception beams of the first array, the first array setting a delay difference between a plurality of antennas; and determining a beam pattern of a transmission beam and a reception beam based on a reception power of a signal transmitted by using transmission beam candidates formed by a second array or of a signal received by using reception beam candidates formed by the second array, the second array setting a phase difference between a plurality of antennas.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a chart illustrating a specific example of a relation between SNR and spectral efficiency.

DESCRIPTION OF EMBODIMENTS

Preferred embodiments of the present invention will be explained with reference to accompanying drawings. Note that the present invention is not limited by the embodiments.

[a] First Embodiment

Figure 1:
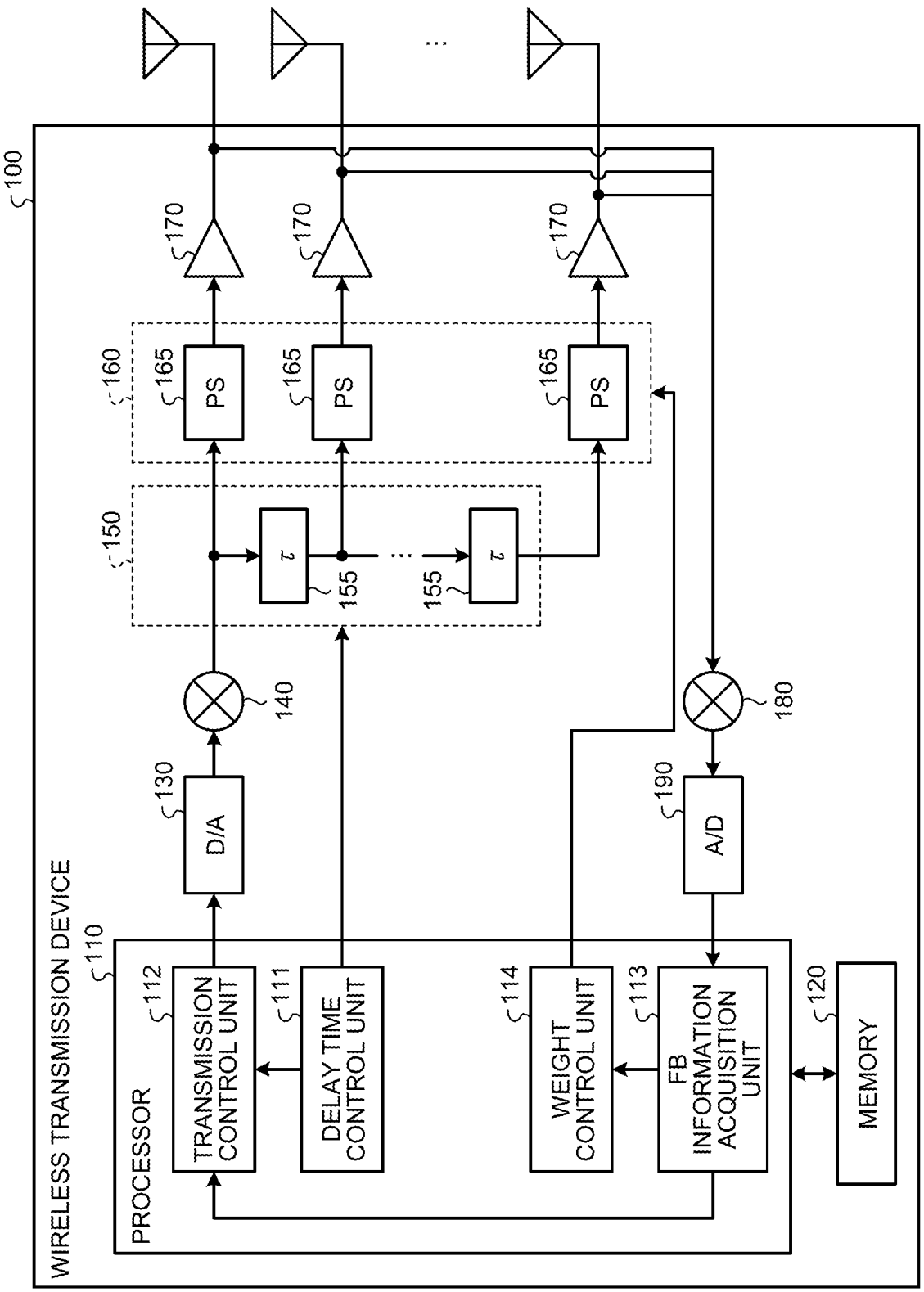
FIG. 1 is a block diagram illustrating a configuration of a wireless transmission device according to a first embodiment.

FIG. 1 is a block diagram illustrating a configuration of a wireless transmission device 100 according to a first embodiment. The wireless transmission device 100 illustrated in FIG. 1 includes a processor 110, a memory 120, a digital/analog (D/A) converter (abbreviated as "D/A" hereinafter) 130, an upconverter 140, a True Time Delay (TTD) array unit 150, a phased array unit 160, power amplifiers 170, a downconverter 180, and an analog/digital (A/D) converter (abbreviated as "A/D" hereinafter) 190.

The processor 110 includes a central processing unit (CPU), a field programmable gate array (FPGA), a digital signal processor (DSP), or the like, for example, and integrally controls the entire wireless transmission device 100. Specifically, the processor 110 includes a delay time control unit 111, a transmission control unit 112, a feed back (FB) information acquisition unit 113, and a weight control unit 114.

When forming transmission beams by the TTD array, the delay time control unit 111 sets delay time for each of delayers 155 of the TTD array unit 150. Specifically, when selecting transmission beam candidates, the delay time control unit 111 sets, to each of the delayers 155, the delay time corresponding to the reciprocal of frequency bandwidth used for transmission of signals. Thereby, the delay time control unit 111 controls the TTD array unit 150 to form transmission beams whose unit frequency corresponds to a single direction, such as subcarriers of an OFDM symbol, for example. Furthermore, when the transmission beams by the phased array are formed by the phased array unit 160, the delay time control unit 111 sets "0" to the delayers 155 as the delay time.

The transmission control unit 112 controls signal transmission of the wireless transmission device 100. Specifically, the transmission control unit 112 generates an OFDM symbol including a plurality of subcarriers, and transmits the OFDM symbol from each of a plurality of antennas. At the time of selecting transmission beam candidates, the transmission control unit 112 transmits the OFDM symbol from each of the antennas when the delay time is set in the delayers 155 by the delay time control unit 111. Thereby, the OFDM symbol with the subcarriers corresponding to respective transmission beams in different directions is transmitted by the TTD array.

Furthermore, at the time of selecting reception beam candidates, the transmission control unit 112 transmits the OFDM symbol from a single antenna. That is, when it is notified by FB information acquired by the FB information acquisition unit 113 that the transmission beam candidates are being selected, the transmission control unit 112 transmits the OFDM symbol from a single antenna for selecting the reception beam candidates.

Furthermore, when the transmission beam candidates and the reception beam candidates are selected and weights are set in phase shifters 165 thereafter by the weight control unit 114, the transmission control unit 112 transmits the OFDM symbol from each of the antennas. Thereby, the OFDM symbol is transmitted to the directions of the transmission beams formed by the phased array.

The FB information acquisition unit 113 acquires the FB information (feedback information) from reception signals received by the antennas. Specifically, the FB information acquisition unit 113 notifies the transmission beam candidates selected based on the OFDM symbol transmitted by the TTD array. Upon acquiring the FB information that notifies the transmission beam candidates, the FB information acquisition unit 113 notifies so to the weight control unit 114. Furthermore, the FB information acquisition unit 113 acquires the FB information that notifies the final transmission beam that is determined from the transmission beam candidates.

When forming the transmission beams by the phased array, the weight control unit 114 sets the weight to each of the phase shifters 165 of the phased array unit 160. Specifically, after the transmission beam candidates and the reception beam candidates are selected, the weight control unit 114 sequentially sets, to the phase shifters 165, the weights for forming the transmission beam candidates notified by the FB information. Thereby, the weight control unit 114 controls the phased array unit 160 to form the selected transmission beam candidates in order. Furthermore, when forming the transmission beams by the TTD array by the TTD array unit 150, the weight control unit 114 sets the weights to the phase shifters 165 for forming the beams in the direction of 0 degree.

The memory 120 includes a random access memory (RAM), a read only memory (ROM), or the like, for example, and stores information used for the processing executed by the processor 110.

The D/A 130 performs D/A conversion of the OFDM symbol generated by the transmission control unit 112.

The upconverter 140 upconverts the OFDM symbol that is being D/A-converted by the D/A 130 to acquire radio frequency signals.

The TTD array unit 150 includes the delayers 155 disposed between the antennas, and forms the transmission beams by the TTD array by generating a delay difference between the signals transmitted from each of the antennas according to the delay time set in the delayers 155.

The phased array unit 160 includes the phase shifters 165 corresponding to each of the antennas, and forms the transmission beams by the phased array by generating a phase difference between the signals transmitted from each of the antennas according to the weights set in the phase shifters 165.

In a case where "0" is set as the delay time in all of the delayers 155 of the TTD array unit 150 and the weights are set in the phase shifters 165 of the phased array unit 160, the transmission beams by the phased array are formed. In a case where the delay time is set in the delayers 155 of the TTD array unit 150 and the weights for forming the beams in the direction of 0 degree are set in the phase shifters 165 of the phased array unit 160, the transmission beams by the TTD array are formed.

The power amplifier 170 is provided by corresponding to each of the antennas, and amplifies the signal of each antenna and transmits the amplified signal from the antennas.

The downconverter 180 downconverts the reception signals received by each of the antennas into baseband frequency signals.

The A/D 190 performs A/D conversion of the reception signals, and outputs the digital reception signals to the processor 110.

Figure 2:
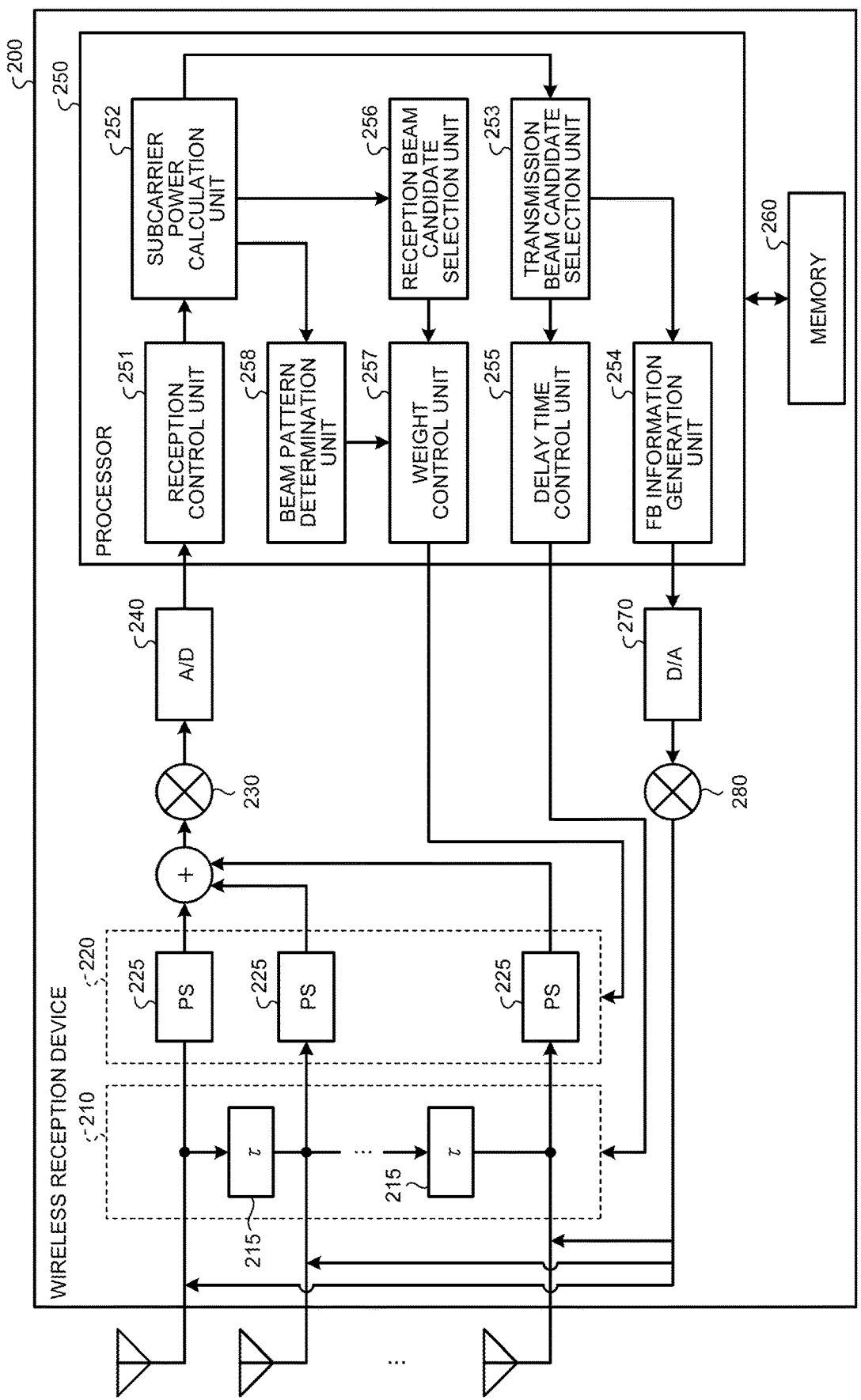
FIG. 2 is a block diagram illustrating a configuration of a wireless reception device according to the first embodiment.

FIG. 2 is a block diagram illustrating a configuration of a wireless reception device 200 according to the first embodiment. The wireless reception device 200 receives signals transmitted from the wireless transmission device 100. The wireless reception device 200 illustrated in FIG. 2 includes a TTD array unit 210, a phased array unit 220, a downconverter 230, an A/D 240, a processor 250, a memory 260, a D/A 270, and an upconverter 280.

The TTD array unit 210 includes delayers 215 disposed between the antennas, and forms reception beams by the TTD array by generating a delay difference between the signals received by each of the antennas according to the delay time set in the delayers 215.

The phased array unit 220 includes phase shifters 225 corresponding to each of the antennas, and forms the reception beams by the phased array by generating a phase difference between the signals received by each of the antennas according to the weights set in the phase shifters 225.

The downconverter 230 downconverts the reception signals received by each of the antennas into baseband frequency signals.

The A/D 240 performs A/D conversion of the reception signals, and outputs the digital reception signals to the processor 250.

The processor 250 includes a CPU, an FPGA, a DSP, or the like, for example, and integrally controls the entire wireless reception device 200. Specifically, the processor 250 includes a reception control unit 251, a subcarrier power calculation unit 252, a transmission beam candidate selection unit 253, an FB information generation unit 254, a delay time control unit 255, a reception beam candidate selection unit 256, a weight control unit 257, and a beam pattern determination unit 258.

The reception control unit 251 controls signal reception of the wireless reception device 200. Specifically, the reception control unit 251 receives the OFDM symbol transmitted from the wireless transmission device 100 by each of the antennas. At the time of selecting the transmission beam candidates, the reception control unit 251 receives the OFDM symbol transmitted from the antennas of the wireless transmission device 100 by a single antenna. Thereby, the OFDM symbol transmitted by the TTD array from the wireless transmission device 100 is received by a single antenna.

Furthermore, at the time of selecting the reception beam candidates, the reception control unit 251 receives, by each of the antennas, the OFDM symbol transmitted from a single antenna of the wireless transmission device 100 when the delay time is set in the delayers 215 by the delay time control unit 255. Thereby, the OFDM symbol with the subcarriers each corresponding to the reception beams of different directions is received by the TTD array.

Furthermore, when the transmission beam candidates and the reception beam candidates are selected and weights are set in the phase shifters 225 thereafter by the weight control unit 257, the reception control unit 251 receives the OFDM symbol by each of the antennas. Thereby, the OFDM symbol is received from the directions of the reception beams formed by the phased array.

The subcarrier power calculation unit 252 calculates the power of each subcarrier (referred to as "subcarrier power" hereinafter) of the OFDM symbol received by the reception control unit 251. That is, at the time of selecting the transmission beam candidates, the subcarrier power calculation unit 252 calculates the subcarrier powers of the OFDM symbol transmitted by the TTD array. At the time of selecting the reception beam candidates, the subcarrier power calculation unit 252 calculates the subcarrier powers of the OFDM symbol received by the TTD array. Furthermore, after the transmission beam candidates and the reception beam candidates are selected, the subcarrier power calculation unit 252 calculates the subcarrier powers of the OFDM symbol transmitted/received by the phased array.

The transmission beam candidate selection unit 253 selects the transmission beam candidates based on the subcarrier powers of the OFDM symbol transmitted by the TTD array. Specifically, the transmission beam candidate selection unit 253 selects a prescribed number of subcarriers in a descending order of the subcarrier powers from the OFDM symbol transmitted by the TTD array and received by a single antenna, and selects the transmission beams in the directions corresponding to the selected subcarriers as the transmission beam candidates. The transmission beam candidate selection unit 253 notifies the selected transmission beam candidates to the FB information generation unit 254.

The FB information generation unit 254 generates the FB information for feeding back the information regarding the transmission beam candidates to the wireless transmission device 100. That is, the FB information generation unit 254 generates the FB information including the information of the directions of the transmission beam candidates. Furthermore, when the final transmission beam and reception beam are determined by the beam pattern determination unit 258, the FB information generation unit 254 generates the FB information for feeding back the information regarding the transmission beam to the wireless transmission device 100.

When forming the reception beams by the TTD array, the delay time control unit 255 sets the delay time in each of the delayers 215 of the TTD array unit 210. Specifically, at the time of selecting the reception beam candidates after the transmission beam candidates are selected, the delay time control unit 255 sets, to each of the delayers 215, the delay time corresponding to the reciprocal of the frequency bandwidth of the signal. Thereby, the delay time control unit 255 controls the TTD array unit 210 to form the reception beams with which each of the subcarriers of the OFDM symbol corresponds to one direction, for example. Furthermore, when the reception beams by the phased array are formed by the phased array unit 220, the delay time control unit 255 sets "0" as the delay time in the delayers 215.

The reception beam candidate selection unit 256 selects the reception beam candidates based on the subcarrier powers of the OFDM symbol received by the TTD array.

Specifically, the reception beam candidate selection unit 256 selects a prescribed number of subcarriers in a descending order of the subcarrier powers from the OFDM symbol transmitted from a single antenna and received by the TTD array, and selects the reception beams in the directions corresponding to the selected subcarriers as the reception beam candidates. The reception beam candidate selection unit 256 notifies the selected reception beam candidates to the weight control unit 257.

When forming the reception beams by the phased array, the weight control unit 257 sets the weight to each of the phase shifters 225 of the phased array unit 220. Specifically, after the transmission beam candidates and the reception beam candidates are selected, the weight control unit 257 sequentially sets, to the phase shifters 225, the weights for forming the reception beam candidates notified from the reception beam candidate selection unit 256. Thereby, the weight control unit 257 controls the phased array unit 220 to form the selected reception beam candidates in order. Furthermore, when forming the reception beams by the TTD array by the TTD array unit 210, the weight control unit 257 sets the weights in the phase shifters 225 for forming the beams in the direction of 0 degree.

The beam pattern determination unit 258 determines a beam pattern of the final transmission beam and reception beam based on the subcarrier powers of the OFDM symbol transmitted/received by the phased array. Specifically, the beam pattern determination unit 258 calculates the mean values of the subcarrier powers of the OFDM symbol transmitted/received by the transmission beam candidates and the reception beam candidates formed sequentially by the phased array. Then, the beam pattern determination unit 258 determines the transmission beam candidates and the reception beam candidates having the largest mean value of the subcarrier powers as the final transmission beam and reception beam. Upon determining the beam pattern, the beam pattern determination unit 258 notifies the final transmission beam to the FB information generation unit 254 and notifies the final reception beam to the weight control unit 257. Thereby, the wireless transmission device 100 forms the final transmission beam by the phased array according to the FB information, and the wireless reception device 200 forms the final reception beam by the phased array under the control of the weight control unit 257.

The memory 260 includes a RAM, a ROM, or the like, for example, and stores information used for the processing executed by the processor 250.

The D/A 270 performs D/A conversion of the FB information generated by the FB information generation unit 254.

The upconverter 280 upconverts the FB information that is being D/A-converted by the D/A 270 to acquire radio frequency signals.

Figure 3:
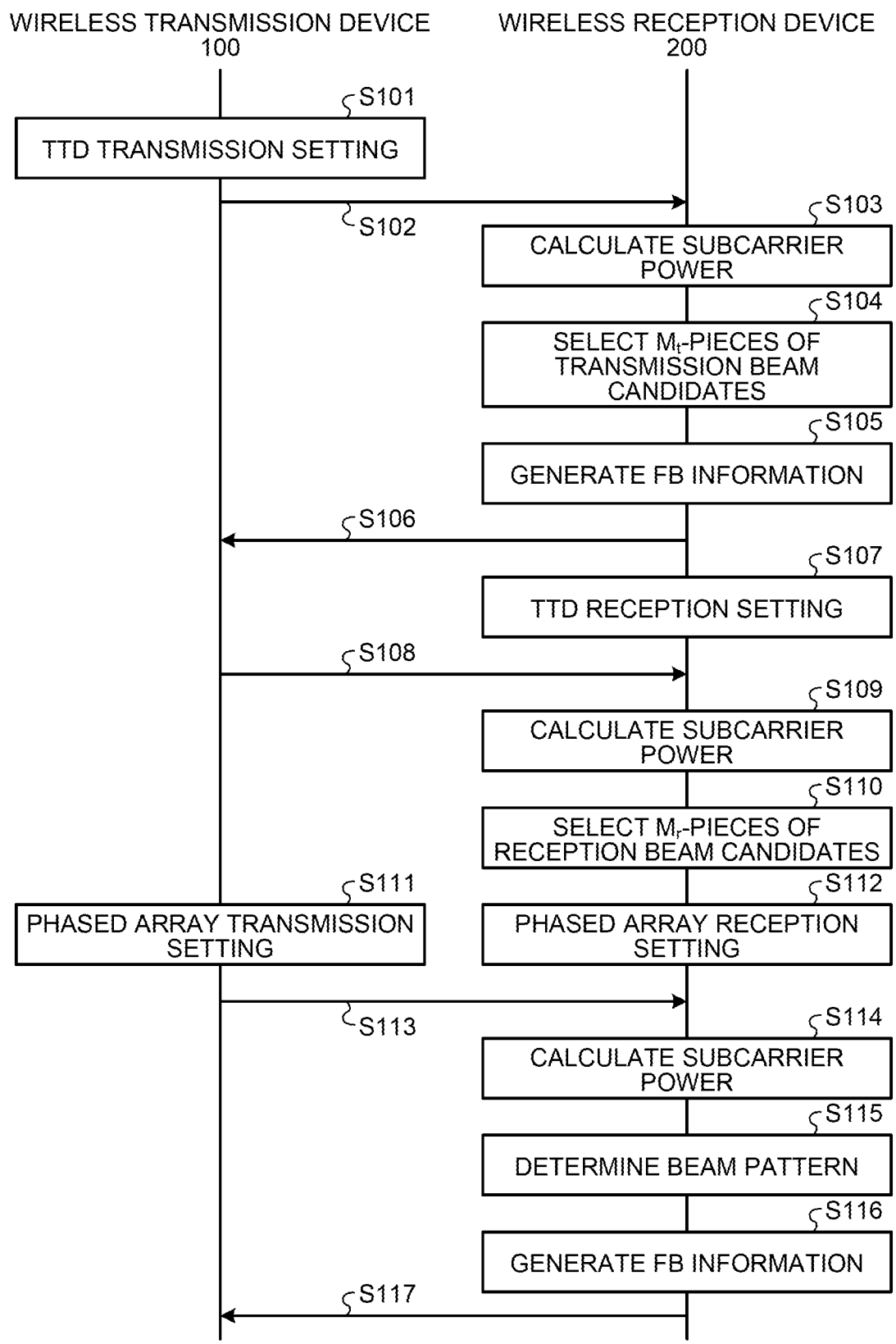
FIG. 3 is a sequence chart illustrating a beam pattern determination method according to the first embodiment.

Next, a beam pattern determination method executed by a wireless communication system including the wireless transmission device 100 and the wireless reception device 200 configured as described above will be described in a specific manner by referring to the sequence chart illustrated in FIG. 3.

First, for selecting the transmission beam candidates, transmission setting by the TTD array is executed in the wireless transmission device 100 (step S101). Specifically, the delay time control unit 111 sets, to each of the delayers 155 of the TTD array unit 150, the delay time corresponding to the reciprocal of the frequency bandwidth of the OFDM symbol to be transmitted. This makes it possible to transmit the OFDM symbol by the transmission beams with each of the subcarriers corresponding to one direction. In other words, it is possible to transmit the OFDM symbol by the TTD array.

Then, an OFDM symbol including the subcarriers is generated by the transmission control unit 112, and the OFDM symbol is transmitted from each of the antennas via the TTD array unit 150 (step S102). Here, at least a single OFDM symbol is transmitted. The transmitted OFDM symbol is received by a single antenna of the wireless reception device 200. That is, at the time of selecting the transmission beam candidates, it is controlled by the reception control unit 251 to receive the OFDM symbol by a single antenna. Therefore, the OFDM symbol transmitted by the TTD array is received by a single antenna of the wireless reception device 200.

Note here that OFDM symbol $y_i(k)^{Tx}$ to be received may be expressed by a following formula (1).

$$y_i(k)^{TX} = H(k)w_{TTD}(k)s_i(k) + z_i(k) \quad (1)$$

In the formula (1), "i" is an index of the OFDM symbol, "k" is an index of a subcarrier, "H(k)" is a channel matrix representing wireless channels, "$w_{TTD}(k)$" is a steering vector representing a delay difference between the antennas in the TTD array unit 150, "$s_i(k)$" is an OFDM symbol to be transmitted, and "$z_i(k)$" is a noise. The received OFDM symbol $y_i(k)^{TX}$ is input to the subcarrier power calculation unit 252 to calculate the subcarrier power (step S103). Specifically, mean value $P(k)^{TX}$ of the powers of each of the subcarriers of $N_i$-pieces of OFDM symbols is calculated by a following formula (2).

$$P(k)^{TX} = \frac{1}{N_i} \sum_{i=1}^{N_i} \|y_i(k)^{TX}\|^2 \quad (2)$$

In the formula (2), "$N_i$" is the total number of OFDM symbols transmitted at the time of selecting the transmission beam candidates, and "$\|y\|$" is the norm of "y". When the subcarrier powers $P(k)^{TX}$ are calculated, a prescribed number, that is, $M_t$-pieces of subcarriers are selected in a descending order of the subcarrier powers $P(k)^{TX}$ by the transmission beam candidate selection unit 253. Then, directions of the transmission beam candidates corresponding to the selected $M_t$-pieces of subcarriers are calculated by the transmission beam candidate selection unit 253. That is, angle "$\theta^{TX}$" representing the direction of the transmission beam candidate corresponding to a subcarrier "k" is calculated by a following formula (3), and the $M_t$-pieces of transmission beam candidates are selected (step S104).

$$\theta^{TX} = \sin^{-1}(\mathrm{mod}(2f_k^{TX}\cdot\tau+1,2)-1) \quad (3)$$

In the formula (3), "$f_k^{TX}$" is the frequency of the subcarrier "k", and "$\tau$" is the delay time set in the delayers 155. The $M_t$-pieces of transmission beam candidates selected herein are the transmission beams formed in the direction for which the subcarrier power is relatively increased, and can be selected by one-time transmission of the OFDM symbol using the TTD array. When the $M_t$-pieces of transmission beam candidates are selected, FB information including the information regarding the directions "$\theta^{TX}$" of each of the transmission beam candidates is generated by the FB information generation unit 254 (step S105). The generated FB information is transmitted to the wireless transmission device 100 (step S106).

Then, for selecting the reception beam candidates, reception setting by the TTD array is executed in the wireless reception device 200 (step S107). Specifically, the delay time control unit 255 sets, to each of the delayers 215 of the TTD array unit 210, the delay time corresponding to the reciprocal of the frequency bandwidth of the OFDM symbol to be transmitted. This makes it possible to receive the OFDM symbol by the reception beams with each of the subcarriers corresponding to one direction. In other words, it is possible to receive the OFDM symbol by the TTD array.

In the meantime, in the wireless transmission device 100 that receives the FB information including the information regarding the transmission beam candidates, the OFDM symbol is transmitted from a single antenna by the transmission control unit 112 (step S108). Here, at least a single OFDM symbol is transmitted. The transmitted OFDM symbol is received by the antennas of the wireless reception device 200 by the TTD array. That is, at the time of selecting the reception beam candidates, the OFDM symbol transmitted from a single antenna of the wireless transmission device 100 is received by the TTD array since the delay time is set in the delayers 215 in the reception setting executed at step S107.

Note here that OFDM symbol $y_i(k)^{RX}$ to be received may be expressed by a following formula (4).

$$y_i(k)^{RX} = c_{TTD}^{H}(k)H(k)w's_i(k) + c_{TTD}^{H}(k)z_i(k) \quad (4)$$

In the formula (4), "i" is an index of the OFDM symbol, "k" is an index of a subcarrier, "$c_{TTD}^{H}(k)$" is a steering vector representing a delay difference between the antennas in the TTD array unit 210, "H(k)" is a channel matrix representing wireless channels, "w'" is an antenna weight vector (unit vector herein) on the transmission side, "$s_i(k)$"

is an OFDM symbol to be transmitted, and "$z_i(k)$" is a noise. The received OFDM symbol $y_i(k)^{RX}$ is input to the subcarrier power calculation unit 252 to calculate the subcarrier power (step S109). Specifically, mean value $P(k)^{RX}$ of the powers of each of the subcarriers of $N_i$-pieces of OFDM symbols is calculated by a following formula (5).

$$P(k)^{RX} = \frac{1}{N_i}\sum_{i=1}^{N_i}\|y_i(k)^{RX}\|^2 \qquad (5)$$

In the formula (5), "$N_i$" is the total number of OFDM symbols transmitted at the time of selecting the reception beam candidates, and "$\|Y\|$" is the norm of "y". When the subcarrier powers $P(k)^{RX}$ are calculated, a prescribed number, that is, $M_r$-pieces of subcarriers are selected in a descending order of the subcarrier powers $P(k)^{RX}$ by the reception beam candidate selection unit 256. Then, directions of the reception beam candidates corresponding to the selected $M_r$-pieces of subcarriers are calculated by the reception beam candidate selection unit 256. That is, direction "$\theta^{RX}$" of the transmission beam candidate corresponding to a subcarrier "k" is calculated by a following formula (6), and the $M_r$-pieces of reception beam candidates are selected (step S110).

$$\theta^{RX}=\sin^{-1}(\mod(2f_k^{RX}\cdot\tau+1,2)-1) \qquad (6)$$

In the formula (6), "$f_k^{RX}$" is the frequency of the subcarrier "k", and "$\tau$" is the delay time set in the delayers 215. The $M_r$-pieces of reception beam candidates selected herein are the reception beams formed in the direction for which the subcarrier power is relatively increased, and can be selected by one-time reception of the OFDM symbol using the TTD array. When the $M_r$-pieces of reception beam candidates are selected herein, it means that the transmission beam candidates and the reception beam candidates are being selected. Thus, a beam pattern that is a combination of the final transmission beam and reception beam is determined as follows from those transmission beam candidates and reception beam candidates.

That is, in the wireless transmission device 100, the weights corresponding to the directions "$\theta^{TX}$" of the transmission beam candidates notified by the FB information are sequentially set to the phase shifters 165 by the weight control unit 114 (step S111). Furthermore, in the wireless reception device 200, the weights corresponding to the directions "$\theta^{Rx}$" of the respective reception beam candidates are sequentially set to the phase shifters 225 by the weight control unit 257 (step S112). For setting such weights, weight vector "$V_{PAA}$" corresponding to the direction "$\theta$" is acquired by a following formula (7).

$$V_{PAA}=\exp(j2\pi d\sin(\theta)/\lambda_c)/\sqrt{N} \qquad (7)$$

In the formula (7), "j" is an imaginary unit, "d" is a vector representing a distance between adjacent antennas, "$\lambda_c$" is a wavelength of the center frequency of a signal transmitted/received, and "N" is the number of antennas used for transmission or reception. By setting the weights in the phase shifters 165, the wireless transmission device 100 becomes capable of performing phased array transmission. By setting the weights in the phase shifters 225, the wireless reception device 200 becomes capable of performing phased array reception.

Thus, the OFDM symbol is transmitted by the transmission beam candidates formed by the phased array (step S113), and the OFDM symbol is received by the reception beam candidates formed by the phased array. Herein, at least a single OFDM symbol is transmitted/received per combination of the transmission beam candidate and the reception beam candidate.

Note here that OFDM symbol $y_p(k)$ to be received may be expressed by a following formula (8).

$$y_p(k)=c_n^H H(k)w_m s_p(k)+c_n^H z_p(k) \qquad (8)$$

In the formula (8), "$c_n^H$" is an antenna weight vector representing a phase difference between the antennas in the phased array unit 220 for forming the n-th ($1\le n \le M_r$) reception beam candidate, "H(k)" is a channel matrix representing wireless channels, "$w_m$" is an antenna weight vector representing a phase difference between the antennas in the phased array unit 160 for forming the m-th ($1\le m \le M_t$) transmission beam candidate, "$s_p(k)$" is an OFDM symbol to be transmitted, and "$z_p(k)$" is a noise. The received OFDM symbol $y_p(k)$ is input to the subcarrier power calculation unit 252 to calculate the subcarrier power (step S114). Specifically, mean value P(p) of the powers of $K_u$-pieces of each of the subcarriers included in the OFDM symbol is calculated by a following formula (9).

$$P(p) = \frac{1}{K_u}\sum_{k=1}^{K_u}\|y_p(k)\|^2 \qquad (9)$$

Such transmission/reception of the OFDM symbol by the phased array and calculation of the subcarrier powers are repeated for all combinations of the $M_t$-pieces of transmission beam candidates and the $M_r$-pieces of reception beam candidates. Then, when the subcarrier powers P(p) are calculated for the combinations of all transmission beam candidates and reception beam candidates, the combination of the transmission beam candidate and the reception beam candidate with which the subcarrier power P(p) become the maximum is specified by the beam pattern determination unit 258. That is, "m" and "n" in the formula (8) are specified for the OFDM symbol $y_p(k)$ in the formula (9) with which the subcarrier power P(p) becomes the maximum. Then, a beam pattern is determined when the specified transmission beam candidate and reception beam candidate are determined as the final transmission beam and reception beam (step S115).

When the beam pattern is determined, the FB information including the information regarding the direction of the final transmission beam is generated by the FB information generation unit 254 (step S116). The generated FB information is transmitted to the wireless transmission device 100 (step S117). Thereby, the wireless transmission device 100 upon receiving the FB information including the information regarding the final transmission beam can form the transmission beam of the determined beam pattern by the phased array, for example. Furthermore, the wireless reception device 200 can form the reception beam of the determined beam pattern by the phased array, for example.

The number of signal transmission times until forming the beam pattern is the total of the OFDM symbol transmission times "$N_i$" by the TTD array for determining the transmission beam candidates, the OFDM symbol transmission times "$N_i$" from a single antenna for determining the reception beam candidates, the OFDM symbol transmission times "$(M_t \times M_r)$" by sequentially forming combinations of the $M_t$-pieces of transmission beam candidates and the $M_r$-pieces of reception beam candidates by the phased array, and "2" that is the number of feedback times of the transmission beam candidate and the beam pattern. Since "$N_i$" representing the repeated transmission times can be "1", the number of transmission times can be "$(M_t \times M_r + 4)$".

Assuming that the number of transmission beams covering all directions is "64", for example, and the number of reception beams covering all directions is "32", for example, the number of transmission times is at least "97", which is the total of "96" that is the transmission times of each beam and "1" that is the number of beam pattern feedback times, in a case where each of all transmission beams and reception beams is searched by the phased array. In the meantime, with the beam pattern determination method according to the first embodiment, the number of transmission times is "(3×3+4)=13" when the number of transmission beam candidates and reception beam candidates to be selected is defined as "3", respectively. Therefore, with the beam pattern determination method according to the first embodiment, it is possible to reduce the number of signal transmission times significantly and to efficiently determine the beam pattern.

As described above, according to the embodiment, a single OFDM symbol is transmitted by the TTD array to select the $M_t$-pieces of transmission beam candidates, a single OFDM symbol is received by the TTD array to select the $M_r$-pieces of reception beam candidates, and the optimal beam pattern is selected from the transmission beam candidates and the reception beam candidates. Therefore, it is possible to select the transmission beam candidates and the reception beam candidates with two-time transmission/reception of the OFDM symbol using the TTD array and to determine the final beam pattern by "$M_t \times M_r$"-time transmission/reception of the OFDM symbol using the phased array. Therefore, the optimal beam pattern can be determined efficiently.

In the first embodiment, the transmission beam candidates are selected first by transmitting the OFDM symbol using the TTD array, and the reception beam candidates are selected thereafter by receiving the OFDM symbol using the TTD array. However, the order of selecting the transmission beam candidates and the reception beam candidates is not limited thereto. The reception beam candidates may be selected first by receiving the OFDM symbol using the TTD array, and the transmission beam candidates may be selected thereafter by transmitting the OFDM symbol using the TTD array. That is, in FIG. 3, for example, steps S107 to S110 may be executed prior to step S101.

[b] Second Embodiment

The characteristic of a second embodiment is that the transmission beam candidates are selected by using the TTD array and an OFDM symbol transmitted by the transmission beam candidates by the phased array is received thereafter by the reception beams by the TTD array to determine a beam pattern.

Figure 4:
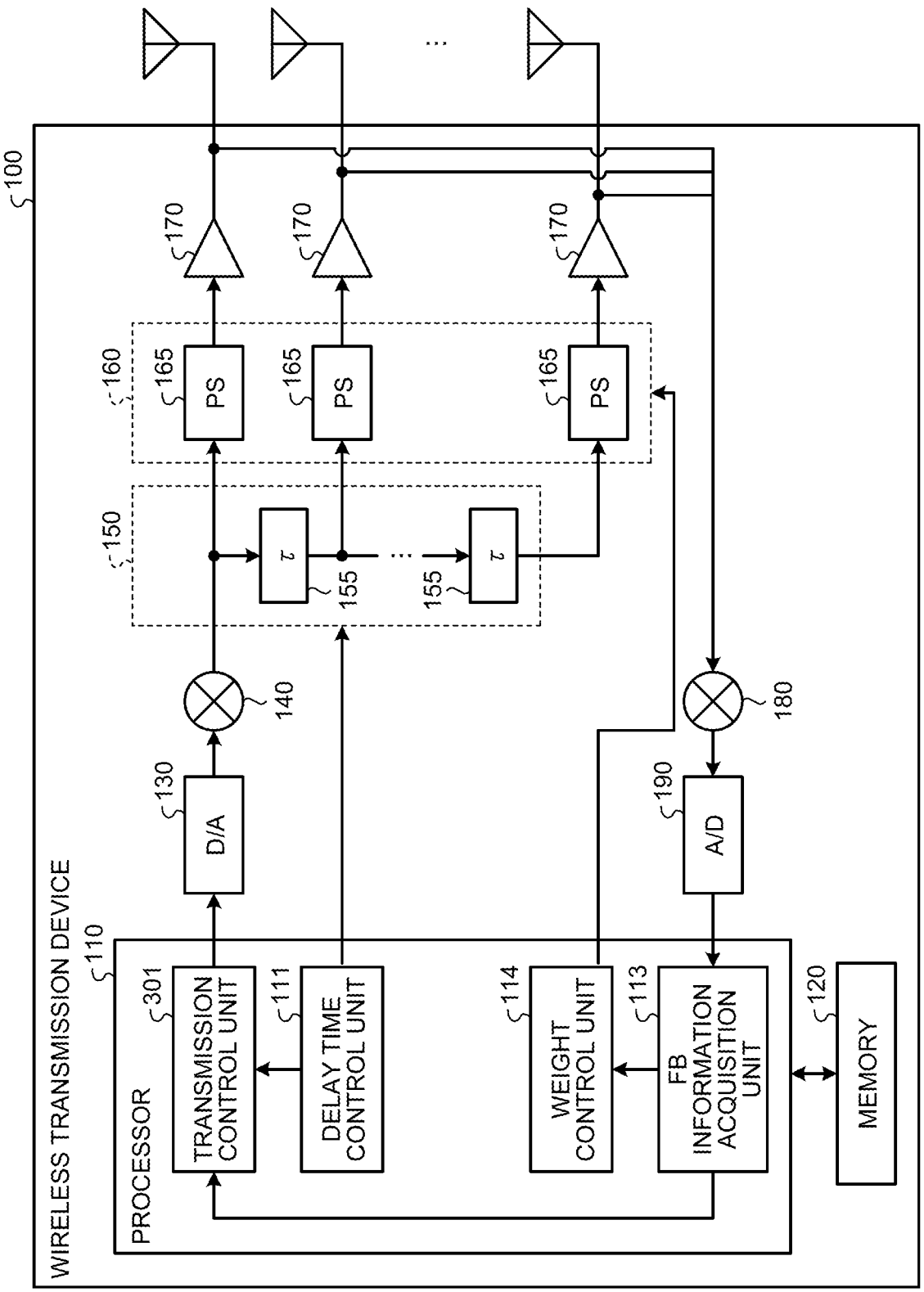
FIG. 4 is a block diagram illustrating a configuration of a wireless transmission device according to a second embodiment.

FIG. 4 is a block diagram illustrating the configuration of the wireless transmission device 100 according to the second embodiment. In FIG. 4, same reference signs are applied to the components same as those of FIG. 1, and explanations thereof are omitted. The wireless transmission device 100 illustrated in FIG. 4 employs the configuration that includes a transmission control unit 301 instead of the transmission control unit 112 of the wireless transmission device 100 illustrated in FIG. 1.

The transmission control unit 301 controls signal transmission of the wireless transmission device 100. Specifically, the transmission control unit 301 generates an OFDM symbol including the subcarriers, and transmits the OFDM symbol from each of the antennas. At the time of selecting the transmission beam candidates, the transmission control unit 301 transmits the OFDM symbol from each of the antennas when the delay time is set in the delayers 155 by the delay time control unit 111. Thereby, the OFDM symbol with the subcarriers corresponding to respective transmission beams in different directions is transmitted by the TTD array.

Furthermore, when the transmission beam candidates are selected and weights are set in the phase shifters 165 thereafter by the weight control unit 114, the transmission control unit 301 transmits the OFDM symbol from each of the antennas. Thereby, the OFDM symbol is transmitted to the directions of the transmission beams formed by the phased array. That is, in the embodiment, after transmitting the OFDM symbol by the phased array, the transmission control unit 301 transmits the OFDM symbol by the transmission beam candidates formed by the phased array without transmitting the OFDM symbol from a single antenna.

Figure 5:
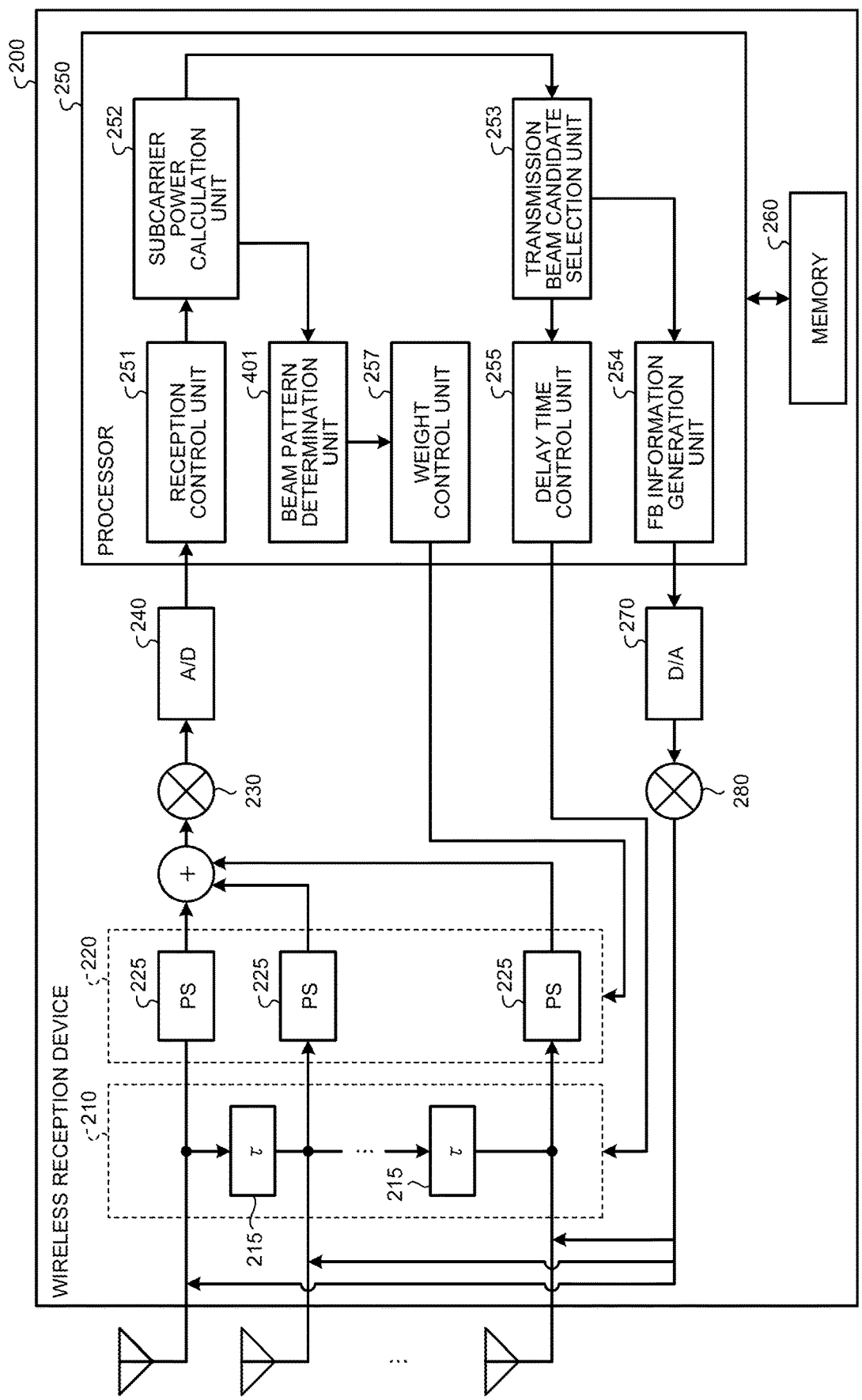
FIG. 5 is a block diagram illustrating a configuration of a wireless reception device according to the second embodiment.

FIG. 5 is a block diagram illustrating the configuration of the wireless reception device 200 according to the second embodiment. In FIG. 5, same reference signs are applied to the components same as those of FIG. 2, and explanations thereof are omitted. The wireless reception device 200 illustrated in FIG. 5 employs the configuration that omits the reception beam candidate selection unit 256 of the wireless reception device 200 illustrated in FIG. 2, and includes a beam pattern determination unit 401 instead of the beam pattern determination unit 258.

The beam pattern determination unit 401 determines the beam pattern of the final transmission beam and reception beam based on the subcarrier powers of the OFDM symbol transmitted by the phased array and received by the TTD array. Specifically, the beam pattern determination unit 401 acquires the subcarrier powers from the subcarrier power calculation unit 252, when each of the OFDM symbols transmitted by the transmission beam candidates formed sequentially by the phased array is received by the reception beams formed by the TTD array. Then, the beam pattern determination unit 401 determines the transmission beam candidates with which the maximum subcarrier power can be acquired as the final transmission beam and determines the reception beam in the direction corresponding to the maximum subcarrier power as the final reception beam. Upon determining the beam pattern, the beam pattern determination unit 401 notifies the final transmission beam to the FB information generation unit 254 and notifies the final reception beam to the weight control unit 257. Thereby, the wireless transmission device 100 forms the final transmission beam by the phased array according to the FB information, and the wireless reception device 200 forms the final reception beam by the phased array according under the control of the weight control unit 257.

Figure 6:
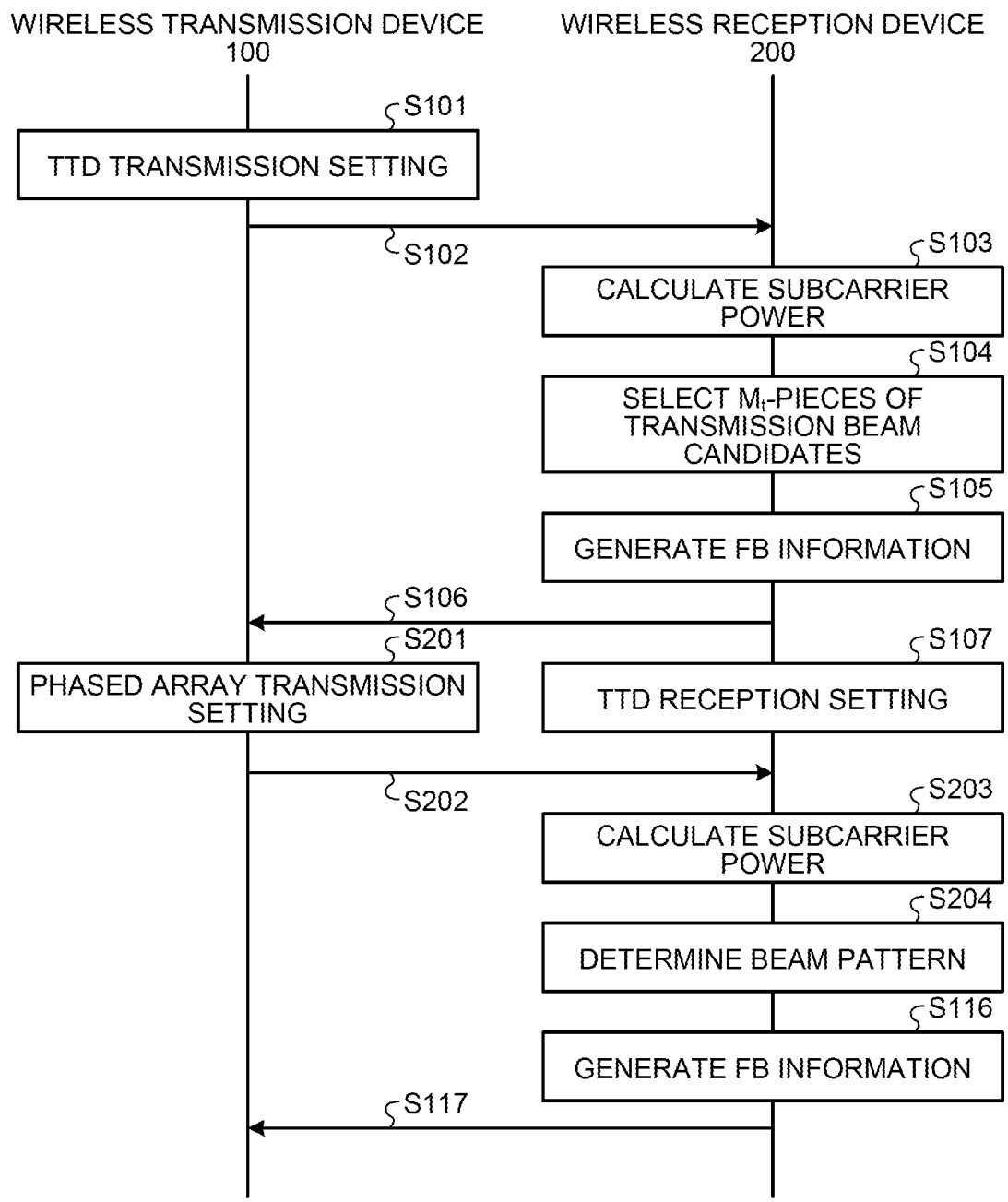
FIG. 6 is a sequence chart illustrating a beam pattern determination method according to the second embodiment.

Next, a beam pattern determination method executed by a wireless communication system including the wireless transmission device 100 and the wireless reception device 200 configured as described above will be described in a specific manner by referring to the sequence chart illustrated in FIG. 6. In FIG. 6, same reference signs are applied to same components as those of FIG. 3, and detailed explanations thereof are omitted.

First, for selecting the transmission beam candidates, transmission setting by the TTD array is executed in the wireless transmission device 100 (step S101). Specifically, the delay time control unit 111 sets, to each of the delayers 155 of the TTD array unit 150, the delay time corresponding to the reciprocal of the frequency bandwidth of the OFDM symbol to be transmitted.

Then, an OFDM symbol including the subcarriers is generated by the transmission control unit 112, and the OFDM symbol is transmitted from each of the antennas via the TTD array unit 150 (step S102). The transmitted OFDM symbol is received by a single antenna of the wireless reception device 200. The received OFDM symbol is input to the subcarrier power calculation unit 252 to calculate the subcarrier powers (step S103).

When the subcarrier powers are calculated, a prescribed number of subcarriers are selected in a descending order of the subcarrier powers, and the transmission beam candidates in the directions corresponding to the selected subcarriers are selected by the transmission beam candidate selection unit 253 (step S104). Then, the FB information including the information regarding the directions of each of the transmission beam candidates is generated by the FB information generation unit 254 (step S105), and transmitted to the wireless transmission device 100 (step S106).

When the transmission beam candidates are selected, in the wireless transmission device 100, the weights corresponding to the directions of the transmission beam candidates notified by the FB information are sequentially set to the phase shifters 165 by the weight control unit 114 (step S201). In the meantime, in the wireless reception device 200, reception setting by the TTD array is executed (step S107). Specifically, the delay time control unit 255 sets, to each of the delayers 215 of the TTD array unit 210, the delay time corresponding to the reciprocal of the frequency bandwidth of the OFDM symbol to be transmitted. Thereby, the wireless transmission device 100 becomes capable of performing transmission with the transmission beam candidates by the phased array, and the wireless reception device 200 becomes capable of performing reception with the reception beams of the TTD array with each of the subcarriers corresponding to one direction.

Then, the OFDM symbol is transmitted with the transmission beam candidates formed by the phased array (step S202), and the OFDM symbol is received by the reception beams formed by the TTD array. Herein, at least a single OFDM symbol is transmitted/received per transmission beam candidate. The reception OFDM symbol received by the wireless reception device 200 is input to the subcarrier power calculation unit 252 to calculate the subcarrier powers (step S203). Specifically, as in the formula (5) described above, the mean values of the powers of each of the subcarriers of the $N_i$-pieces of OFDM symbols transmitted for a single transmission beam candidate are calculated.

As described, transmission of the OFDM symbol by the phased array, reception of the OFDM symbol by the TTD array, and calculation of the subcarrier powers of the received OFDM symbol are repeatedly executed for all of the transmission beam candidates. Then, when the subcarrier powers are calculated for all of the transmission beam candidates, the transmission beam candidate with which the subcarrier power becomes the maximum and the reception beam in the direction corresponding to the maximum subcarrier power are specified by the beam pattern determination unit 401. The beam pattern is determined, when those transmission beam candidate and reception beam are determined as the final transmission beam and reception beam (step S204).

When the beam pattern is determined, the FB information including the information regarding the direction of the final transmission beam is generated by the FB information generation unit 254 (step S116). The generated FB information is transmitted to the wireless transmission device 100 (step S117). Thereby, the wireless transmission device 100 that receives the FB information including the information regarding the final transmission beam can form the transmission beam of the determined beam pattern by the phased array, for example. Furthermore, the wireless reception device 200 can form the reception beam of the determined beam pattern by the phased array, for example.

The number of signal transmission times until forming the beam pattern is the total of the OFDM symbol transmission times "$N_i$" by the TTD array for determining the transmission beam candidates, the OFDM symbol transmission times "$(M_t \times N_i)$" by sequentially forming the $M_t$-pieces of transmission beam candidates by the phased array, and "2" that is the number of feedback times of the transmission beam candidate and the beam pattern. Since "$N_i$" representing the repeated transmission times can be "1", the number of transmission times can be "$(M_t+3)$".

Assuming that the number of transmission beams covering all directions is "64", for example, and the number of reception beams covering all directions is "32", for example, the number of transmission times is at least "97", which is the total of "96" that is the transmission times of each beam and "1" that is the number of beam pattern feedback times, in a case where each of all transmission beams and reception beams is searched by the phased array. In the meantime, with the beam pattern determination method according to the second embodiment, the number of transmission times is "(3+3)=6" when the number of transmission beam candidates to be selected is defined as "3". Therefore, with the beam pattern determination method according to the second embodiment, it is possible to reduce the number of signal transmission times significantly and to efficiently determine the beam pattern.

Furthermore, the beam pattern determined in the manner described above can improve the communication efficiency. Specifically, FIG. 7 is a chart illustrating a specific example of the spectral efficiency of the beam pattern determined by the beam pattern determination methods according to the first embodiment and the second embodiment. That is, FIG. 7 illustrates a simulation result of the spectral efficiency corresponding to SNR.

In FIG. 7, cross marks indicate a theoretically ideal state, and black square marks indicate the simulation result of the beam pattern determined by searching all transmission beams and reception beams by the phased array, respectively. Furthermore, white circles indicate the simulation result of the beam pattern determined by the beam pattern determination method according to the first embodiment, and star marks indicate the simulation result of the beam pattern determined by the beam pattern determination method according to the second embodiment.

In a case where SNR is as relatively low as about −5 dB, the spectral efficiency of the beam pattern determined by searching all beams has the highest spectral efficiency as in the vicinity of (A) in FIG. 7, and almost the same spectral efficiency can be acquired with the beam pattern according to the second embodiment. Furthermore, in a case where SNR is as relatively high as about 15 dB, the higher spectral efficiency can be acquired with the beam patterns according to the first and second embodiments than the case of the beam pattern determined by searching all beams as in the vicinity of (B) in FIG. 7. That is, with the beam pattern determination methods according to the first and second embodiments with significantly smaller number of signal transmission times, it is possible to determine the beam pattern capable acquiring the same or better quality than the case of determining the beam pattern by searching all transmission beams and reception beams, respectively.

As described above, according to the embodiment, a single OFDM symbol is transmitted by the TTD array to select the $M_t$-pieces of transmission beam candidates, the selected transmission beam candidates are sequentially formed by the phased array to transmit the OFDM symbol, and the OFDM symbol is received by the TTD array to determine the optimal beam pattern. Therefore, it is possible to select the transmission beam candidates with one-time transmission of the OFDM symbol using the TTD array and to determine the final beam pattern by "$M_t$"-time transmission of the OFDM symbol using the phased array. Therefore, the optimal beam pattern can be determined efficiently.

In the second embodiment, the transmission beam candidates are selected first by transmitting the OFDM symbol using the TTD array, and the OFDM symbol transmitted by the transmission beam candidates formed by the phased array are received by the TTD array to determine the beam pattern. However, the order of determining the beam pattern is not limited thereto. The reception beam candidates may be selected by receiving the OFDM symbol transmitted from a single antenna by the TTD array, and the OFDM symbol transmitted using the TTD array may be received with the reception beam candidates formed by the phased array to determine the beam pattern. In short, the optimal transmission beam and reception beam can be determined by selecting the transmission beam candidates or the reception beam candidates using the TTD array, sequentially forming the selected transmission beam candidates or reception beam candidates by the phased array and, at the same time, executing transmission/reception using the TTD array.

Furthermore, while the transmission beam candidates are selected by transmitting the OFDM symbol using the TTD array in the second embodiment, it is also possible to have all transmission beams covering all directions as the transmission beam candidates. That is, it is possible to determine the optimal beam pattern by receiving, by the TTD array, the OFDM symbol transmitted by sequentially forming all transmission beams by the phased array. Similarly, it is also possible to determine the optimal beam pattern by having all reception beams covering all directions as the reception beam candidates, sequentially forming all reception beams by the phased array, and receiving the OFDM symbol transmitted using the TTD array.

In each of the embodiments, the delayer is provided between the antennas so as to form the beams of the TTD array by performing radio frequency (RF) band analog processing. However, the beams of the TTD array can also be formed by digital processing. That is, in the processor, by shifting the signal sample of each antenna in the time direction, it is possible to form the beams by the TTD array same as the case of providing the delayer between the antennas. Furthermore, it is also possible to form the beams of the TTD array by baseband or intermediate frequency (IF) band analog processing.

Furthermore, it is also possible to use the beam patterns determined by the beam pattern determination methods according to each of the embodiments for transmission/reception of signals of frequency bands different from the frequency band at the time of determining the beam patterns. That is, a beam pattern may be determined by transmitting/receiving an OFDM symbol of a relatively low first frequency band by the beam pattern determination method according to each of the embodiments, and the determined transmission beam and reception beam may be used for transmission/reception of the OFDM symbol of a relatively high second frequency band such as a millimeter wave, for example. Moreover, a beam pattern may be determined by transmitting/receiving an OFDM symbol of a relatively low first frequency band, and transmission/reception beams may be searched again by using the OFDM symbol of a relatively high second frequency band such as a millimeter wave, for example, in the vicinity of the determined beam pattern for determining a beam pattern used for transmission/reception of signals.

According to an aspect of the wireless communication system, the wireless communication device, and the beam pattern determination method disclosed herein, it is possible to efficiently determine the optimal beam pattern.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication system comprising a wireless transmission device and a wireless reception device, wherein
the wireless reception device includes:
a plurality of reception antennas; and
a processor connected to the reception antennas, wherein
the processor executes a process including:
selecting transmission beam candidates or reception beam candidates based on a reception power of a signal transmitted by using transmission beams of a first array or of a signal received by using reception beams of the first array, the first array setting a delay difference between a plurality of antennas; and
determining a beam pattern of a transmission beam and a reception beam based on a reception power of a signal transmitted by using transmission beam candidates formed by a second array or of a signal received by using reception beam candidates formed by the second array, the second array setting a phase difference between a plurality of antennas.

2. The wireless communication system according to claim 1, wherein
the selecting includes:
calculating reception powers of each of unit frequencies of the signal transmitted by using the transmission beams of the first array;
selecting a predetermined number of the unit frequencies in a descending order of the calculated reception powers; and
selecting the transmission beams in directions corresponding to the selected unit frequencies as the transmission beam candidates.

3. The wireless communication system according to claim 1, wherein
the selecting includes selecting the transmission beam candidates based on the reception power of the signal transmitted by using the transmission beams of the first array, and the determining includes:

receiving the signal transmitted from the wireless transmission device by using the reception beams of the first array;

selecting the reception beam candidates based on the reception power of the received signal;

receiving, by using the reception beam candidates formed by the second array, the signal transmitted by using the transmission beam candidates formed by the second array; and determining the beam pattern based on the reception power of the received signal.

4. The wireless communication system according to claim 3, wherein the determining the beam pattern includes determining, as a final transmission beam and a final reception beam, a combination of a transmission beam candidate and a reception beam candidate with which the reception power becomes maximum.

5. The wireless communication system according to claim 1, wherein the selecting includes selecting the transmission beam candidates based on the reception power of the signal transmitted by using the transmission beams of the first array, and the determining includes:

receiving, by using the reception beams of the first array, the signal transmitted by using the transmission beam candidates formed by the second array; and determining the beam pattern based on the reception power of the received signal.

6. The wireless communication system according to claim 5, wherein the determining includes:

calculating the reception power of each of unit frequencies of the received signal; and determining, as a final transmission beam and a final reception beam, a combination of a transmission beam candidate with which the reception power becomes maximum and a reception beam in a direction corresponding to a unit frequency with the maximum reception power.

7. A wireless communication device comprising:
a plurality of reception antennas; and
a processor connected to the reception antennas, wherein the processor executes a process including:

selecting transmission beam candidates or reception beam candidates based on a reception power of a signal transmitted by using transmission beams of a first array or of a signal received by using reception beams of the first array, the first array setting a delay difference between a plurality of antennas; and determining a beam pattern of a transmission beam and a reception beam based on a reception power of a signal transmitted by using transmission beam candidates formed by a second array or of a signal received by using reception beam candidates formed by the second array, the second array setting a phase difference between a plurality of antennas.

8. A beam pattern determination method comprising:
by a wireless reception device, forming a reception beam of a first array that sets a delay difference between a plurality of antennas;

by a wireless transmission device, forming transmission beam candidates by a second array that sets a phase difference between a plurality of antennas;

by the wireless reception device, receiving, by using the reception beam of the first array, a signal transmitted by using the transmission beam candidates formed by the second array; and by the wireless reception device, determining a beam pattern of a transmission beam and a reception beam based on a reception power of the received signal.

9. A beam pattern determination method comprising:
by a wireless transmission device, forming a transmission beam of a first array that sets a delay difference between a plurality of antennas;

by a wireless reception device, forming reception beam candidates by a second array that sets a phase difference between a plurality of antennas;

by the wireless reception device, receiving, by using the reception beam candidates formed by the second array, a signal transmitted by the transmission beam of the first array; and by the wireless reception device, determining a beam pattern of a transmission beam and a reception beam based on a reception power of the received signal.

* * * * *